Inventor:
A. KRÜSSMANN,
By Herbert W. Thompson
His Attorney.

Patented May 23, 1944

2,349,287

UNITED STATES PATENT OFFICE 2,349,287

DEVICE FOR CONTROLLING PRECESSIONAL FORCES IN GYROSCOPES

Adolf Krüssmann, Berlin-Wilmersdorf, Germany; vested in the Alien Property Custodian Application March 1, 1940, Serial No. 321,805
In Germany February 10, 1939

4 Claims. (Cl. 74—5)

The invention relates to improvements in devices for controlling precessional forces in gyroscopes. The invention refers particularly to a device for controlling precessional forces in which the precessional force is counterbalanced by an auxiliary force controlled by that precessional force, said force being for instance an electrically controlled force.

Arrangements hitherto known have only been adapted to compensate for unidirectional precessional forces. In order to make such arrangements responsive to forces opposed in direction, a spring force was applied to the gimbal ring of the gyroscope causing a deflection of the gimbal ring, the deflecting tendency being counteracted by some force controlled by the deflection of the gimbal ring, so that even in the absence of any precessional force an auxiliary force of a predetermined amount was necessary for balancing the tension of the spring. The use of such springs, however, has the following disadvantages: The measurement is dependent on the temperature as the spring tension varies under the influence of the temperature, of the aging of the spring and of the auxiliary force in as much as—if the precessional force remains constant—fluctuations in the latter affect the amount of the deflection of the gimbal ring necessary to produce the balancing force so that the spring characteristic influences the measuring result. Further aims, objects and advantages of the present invention are revealed in the following description of the invention with reference to the accompanying drawing, of which Fig. 1 represents a side elevation, partly in cross section, of a turning indicator gyroscope, and Fig. 2 a modification of same likewise partly in cross section.

Figure 1:
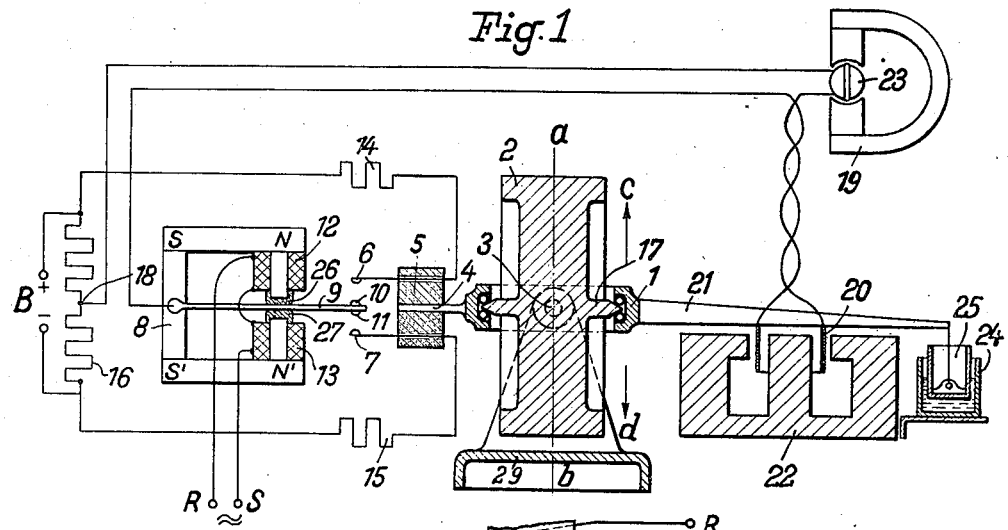

Fig. 1 shows the gimbal ring 1, which is turnably mounted in the support 29 about the axis 3. The angular rate gyroscope 2 is turnably mounted on the gimbal ring 1 about an axis 17 perpendicular to the axis 3 of the gimbal ring. Said gimbal ring represents a two-armed lever, one arm 4 of which carries an insulating piece 5 to which are secured two leaf spring contacts 6 and 7. A polarized relay is provided having two permanent magnets NS and N'S' connected by a soft iron core 8 and having a soft iron armature 9 which is turnably mounted with its one end on the middle portion of the soft iron core 8 thereby polarizing the free end of the armature 9, said armature carrying at its free end two contacts 10, 11. Two coils 12, 13 mounted on the two legs of the core 8 are series connected to the alternating network RS in such a manner that, if the polarized relay is excited by alternating current from the network RS, the armature 9 oscillates between the contacts 6, 7 without touching same.

The two contacts 6, 7 are connected via resistors 14, 15, respectively, to the ends of a potentiometer resistance 16 fed by a direct current source B and having a center tap 18, a D. C. responsive indicating instrument 19 of the moving coil type and a movable coreless coil 20 being connected in series between said center tap 18 and said armature 9. The coil 20 is secured to the other arm 21 of the gimbal ring 1 and is substantially rectilinearly movable in the magnetic field of the permanent magnet 22, thus forming a counterbalancing system. The gimbal ring is supported so as not to be subject to any force in the absence of the precessional force and the auxiliary force—the latter being in this embodiment the electric power source B, so that the movement of the gimbel ring remains unaffected by any resetting force.

Be it assumed that the gimbal ring 1 is turned about the axis a—b lying in two vertical planes, one passing through the axis 3, the other passing through the axis 17, the gimbal ring is deflected about its axis 3 as indicated by the arrows c or d. Thus, the contact 6 of the lever 4 touches periodically the contact 10 of the armature 9, or contact 7 of the lever periodically touches contact 11 of said armature, the frequency of the contact closing corresponding to the alternating current frequency of the network RS. Thereby the following circuit is periodically closed: Center tap 18, movable coil 23 of the indicating instrument 19, coil 20 of the counterbalancing system, armature 9, contact 10 or 11, respectively, contact 6 or 7, respectively, resistor 14 or 15, respectively, and the positive or negative terminal, respectively, of the D. C. source B. In consequence thereof, a force acts on coil 20 counteracting the precessional force, thereby returning the gimbal ring until the contacts 10 or 11 of the oscillating armature 9 no longer touch the contacts 6 or 7. Under the influence of the precessional force, the aforementioned circuit is periodically re-established. The mean value of the current in the coil 20 and in the movable coil 23 of the indicating instrument 19 depends on the duration of the contact between the armature 9 and the contacts 6 or 7, respectively, and said duration in turn depends on the contact pressure which increases in proportion to the gimbal ring deflection. Hence, the mean value of this current is an exact equivalent of the amount of the precessional force and therefore of the rate of the turning about the axis a—b. In this way, the precessional movement is counterbalanced by the electrodynamic counterforce of the system 20, 22, and the indicating instrument 19, 23 furnishes an indication of the rate of turn in that its position is dependent on or a measure of the precessional force exerted by the gyroscope. In order to avoid hunting of the device, dampening means are provided comprising a fluid-filled vessel 24 and a piston 25 movable therein and fastened to the free end of the gimbal arm 21.

If no A. C. is available for exciting the polarized relay, such current may be dispensed with. If precessional forces are present, the system begins to swing automatically, thereby establishing the necessary contact. In such cases, the frequency of oscillation increases according to the amount of the precession moment to be balanced.

In order to avoid mechanical reaction on the gimbal ring in consequence of the closing of the contacts, the armature 9 or the contacts 6, 7 are resiliently mounted. In the case of equal contact pressures, the contacts supported by rubber contact carriers allow manifoldly greater currents to pass than metallic contact springs while in addition the current flows more evenly. To avoid shocks, stops 26 and 27 having rubber pads are provided for limiting the movement of the armature of the polarized relay. In this way, sinusoidal armature oscillations are obtained instead of rectangular oscillations resulting in an even current flow in the coil 20 and the indicating instrument 19.

Figure 2:
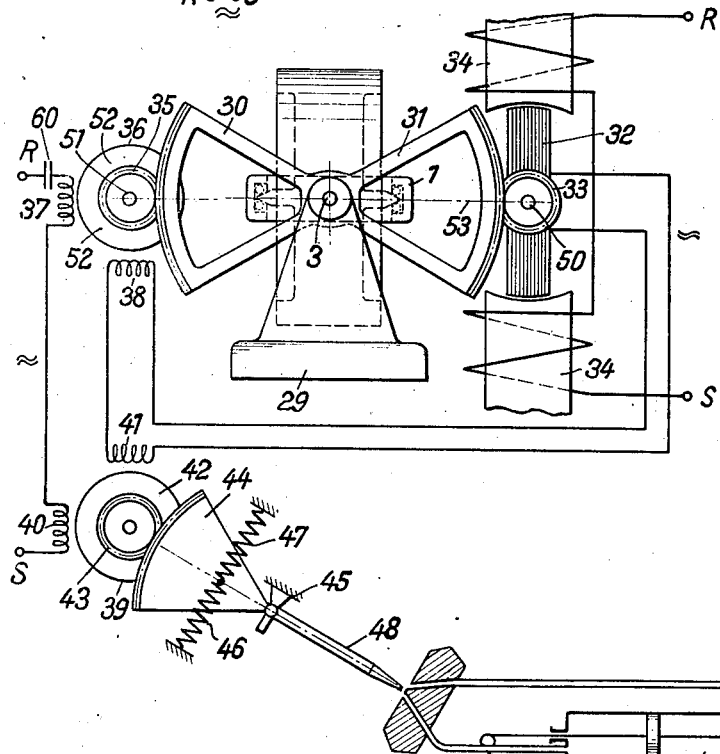

According to Fig. 2, two toothed segments 30, 31 are arranged symmetrically relative to the gimbal axis 3 and rigidly coupled with the gimbal ring 1 of the gyroscopic turning indicator. One of said segments 31 drives a gear wheel 33 mounted on an axle 50 around which a coil 32 is rotatably mounted in the magnetic field of an electromagnet 34 fed from the A. C. network RS, coil 32 being wound about an axis 53 perpendicular to the axis 50. The other toothed segment 30 meshes with a gear wheel 35 secured to the axle 51 of a two-phase induction or Ferraris motor 36 possessing a drum 52 driving the gear wheel 35 and has exciting coils 37, 38 the axes of which are perpendicular to each other, coil 37 being fed by the alternating network RS while the other coil, 38, is fed by the alternating electromotive force induced in coil 32. A capacity 60 is provided for producing the necessary phase angle of the exciting currents in both exciting coils 37, 38. Also, in this case, the gyroscope is mounted so as not to be acted upon by reactionary forces, i. e., in the absence of precessional and auxiliary forces, the gimbal ring may be turned about its axis 3 without hindrance by any resetting force.

In the normal position, the winding axis 53 of the coil 32 is perpendicular to the axis of the magnetic induction field 34 so that no voltage is induced in the coil and the Ferraris motor 36 is at a standstill. If, however, a precessional moment acts on the gimbal ring, the coil 32 will be rotated so that an alternating electromotive force is induced in said coil, the phase thereof being reversed when the direction of the precessional force is reversed. As the winding 38 of the Ferraris motor is fed by this electromotive force, the Ferraris motor starts to run and turns back the toothed segment 30 and the gimbal ring 1. In this way, an equilibrium is established between the precessional moment and the moment of the Ferraris motor. Therefore, the value of the voltage induced in the balanced condition is exactly proportional to the value of the precessional force and, hence, to the angular velocity. This voltage is measured in a direction responsive measuring instrument, for instance, a second Ferraris motor 39 having a drum armature 42 and exciting coils 40, 41, coil 40 and coil 37 being fed in series from the network RS, coil 41 and coil 38, on the other hand, being fed in series by the voltage delivered by coil 32. The drum armature 42 carries a gear wheel 43 meshing with the toothed segment 44 rotatably mounted about an axle 45. The springs 46, 47 exert a certain reactionary force on the segment 44 and, hence, on the drum 42. The direction responsive deflections of the second Ferraris motor are a direct equivalent of the amount and the direction of the precessional force to be measured. The toothed segment 44 may carry a jet pipe 48, this being part of a jet pipe relay known per se supplying amplified fluid pressure impulses for actuation of a pressure means servo-motor 55 for the adjustment of a controlled member, for instance, an aircraft rudder 56, in response to the angular velocity influencing the gyroscope.

I claim:

1. A device for opposing and counterbalancing precession of an angular rate gyroscope mounted for precessional movement comprising the combination of an electric relay system including an A. C. power source, an electromagnet energized by said A. C. source to produce an alternating magnetic field, a rotatable coil situated in the field of the electromagnet, means associating said coil and the gyroscope so that the coil is displaced relative to the electromagnetic field in proportion to the degree of precessional movement of the gyroscope and in a direction depending upon the direction of such precessional movement, to thereby provide an induced variable alternating electromotive force in said relay system, a servo motor in said system controlled by the induced electromotive force from the rotatable coil and by the alternating current delivered thereto by the alternating power source, said servo motor being rotatably connected to the gyroscope to thereby exert an oppositely directed torque about the axis of precession of said gyroscope counterbalancing the precession thereof.

2. A device as claimed in claim 1 in which the servo motor is of the induction type having two perpendicularly disposed field windings, one of which is fed by the rotatable coil situated in the field of the electromagnet and the other of which is fed by the A. C. power source.

3. A device as claimed in claim 1 in which the servo motor is of the induction type having two perpendicularly disposed field windings, one of which is fed by the rotatable coil situated in the field of the electromagnet and the other of which is fed by the A. C. power source, and a further induction motor, having similarly disposed and controlled field windings in said relay system, whose movement is proportional to the degree of precessional movement of the gyroscope.

4. A device for opposing and counterbalancing precession of an angular rate gyroscope mounted for precessional movement comprising the combination of an A. C. supplied circuit having a relay whose voltage output is proportional to the degree of precessional movement of said gyroscope, and a servo motor in said circuit, controlled by the output of said relay and connected to said gyroscope to provide an opposing torque about the axis of precession of the gyroscope which counterbalances the precession of said gyroscope.

ADOLF KRÜSSMANN.